(12) United States Patent
Grupp (10) Patent No.: US 7,448,552 B2
(45) Date of Patent: Nov. 11, 2008

(54) ADAPTABILITY OF THE INTERFACE OF A PORTABLE OBJECT AS A FUNCTION OF ENVIRONMENT

(75) Inventor: Joachim Grupp, Enges (CH)

(73) Assignee: Asulab S.A., Marin (CH)

( * ) Notice: Subject to any disclaimer, the term of this patent is extended or adjusted under 35 U.S.C. 154(b) by 547 days.

(21) Appl. No.: 10/537,819

(22) PCT Filed: Dec. 1, 2003

(86) PCT No.: PCT/EP03/13505

§ 371 (c)(1),
(2), (4) Date: Jun. 6, 2005

(87) PCT Pub. No.: WO2004/054213

PCT Pub. Date: Jun. 24, 2004

(65) Prior Publication Data

US 2006/0016896 A1    Jan. 26, 2006

(30) Foreign Application Priority Data

Dec. 5, 2002   (CH) .................................. 2063/02

(51) Int. Cl.
G06K 7/10 (2006.01)
(52) U.S. Cl. ................................. 235/472.01
(58) Field of Classification Search ................. 235/472.01–472.03
See application file for complete search history.

(56) References Cited

U.S. PATENT DOCUMENTS 4,432,653 A * 2/1984 Ting-Ching ................. 368/250
6,012,030 A   1/2000 French-St. George
6,954,657 B2 * 10/2005 Bork et al. .................. 455/567
2004/0127197 A1 * 7/2004 Roskind .................. 455/412.2

FOREIGN PATENT DOCUMENTS

| EP | 0 453 089 A2 | 10/1991 |
| EP | 0 791 868 | 8/1997 |
| EP | 0 838 737 | 4/1998 |
| EP | 1 172 991 A1 | 1/2002 |
| EP | 1 253 547 A2 | 10/2002 |
| GB | 2 343 779 A | 5/2000 |
| JP | 1-284791 | 11/1989 |

OTHER PUBLICATIONS

Patent Abstracts of Japan, vol. 1999, No. 12, Oct. 29, 1999 (JP 11 194797).
Patent Abstracts of Japan, vol. 1997, No. 02, Feb. 28, 1997 (JP 08 271858).
International Search Report completed Apr. 6, 2004 and mailed Apr. 16, 2004 (PCT/EP03/13505).

* cited by examiner

*Primary Examiner*—Jamara A Franklin
(74) *Attorney, Agent, or Firm*—Griffin & Szipi, PC (57) ABSTRACT

The invention relates to a portable electronic object including a "voice" user interface containing sound signal-reception and a management unit which manages the received sound signals. The invention includes an ambient noise sensor which can be used to measure the level of ambient noise (Bm). The sensor is connected to the aforementioned control unit. The control unit also compares the measured ambient noise level with a pre-defined noise level (Bo), and includes controls that deactivate the sound signal-processing when the ambient noise level exceeds the pre-defined noise level (Bm>Bo).

16 Claims, 5 Drawing Sheets

ADAPTABILITY OF THE INTERFACE OF A PORTABLE OBJECT AS A FUNCTION OF ENVIRONMENT

This is a National Phase Application in the United States of International Patent Application No. PCT/EPO3/13505 filed Dec. 1, 2003, which claims priority on Swiss Patent Application No. 2063/02, filed Dec. 5, 2002. The entire disclosures of the above patent applications are hereby incorporated by reference.

FIELD OF THE INVENTION

The present invention relates to a portable object, of the wristwatch, portable telephone or electronic diary type, comprising at least one user interface, for example of the vocal interface type, for receiving and transmitting signals and a control unit for the user interface comprising means for processing the transmitted and received signals.

BACKGROUND OF THE INVENTION

Such portable objects are known from the prior art, particularly from Japanese Patent No. 01-284 791, which concerns a diary watch with voice recognition. A vocal interface is provided, allowing the user to introduce his time schedule orally and word recognition means and storage means for processing the received data and then storing the data once processed.

U.S. Pat. No. 6,012,030 presents a portable communication device including a multimode user interface including a vocal interface and a tactile or graphic interface. The portable device can pass automatically from a vocal interface standby mode to a vocal interface active mode when the user selects the vocal interface, or conversely from the active state to the standby state when the user selects another interface.

Such portable devices have, however, several drawbacks. In fact, since these types of device are portable, the user is capable of using them at any time and especially anywhere, for example in public transport or places. It often happens that the external or ambient conditions are altered during use. For example it can happen that the ambient noise becomes excessive so as to make the vocal interface unusable, the voice recognition system no longer being able to interpret correctly the sounds it is receiving. Likewise, it can happen that the ambient light becomes insufficient for the user to use the tactile or graphic interface comfortably. The idea consisting in this latter case in using lighting means is unsatisfactory since these lighting means consume too much energy, moreover, in the case of a tactile screen, a large part of the illumination is filtered by the latter. The use of a user interface also depends on the environment in which the portable object is located, thus, a user interface using a tactile glass or touch sensitive screen or panel for receiving data cannot be used in a liquid environment. Likewise, an interface using radio-frequency signal reception cannot be used in an environment where too many unwanted frequencies are received.

It is an object of the invention to overcome the aforementioned drawbacks, by preventing the user from using an interface, for example a vocal interface, when the latter is no longer able to operate properly, and, as far as possible, allowing the user to still be able to use an operational interface.

SUMMARY OF THE INVENTION

Thus the present invention, according to one embodiment, concerns a portable electronic object comprising a first user interface including sound signal reception means and a management unit including sound signal processing means, characterised in that it further includes an ambient noise sensor for measuring an ambient noise level, the noise sensor being connected to the management unit and in that said management unit also includes first comparison means for comparing the ambient noise level with a predefined noise level, and control means arranged for deactivating the sound signal processing means when the ambient noise level exceeds the predefined noise level.

According to another embodiment, the portable electronic object includes a first user interface, at least a second user interface and a user interface management unit including first and at least second processing means respectively associated with the first and at least second user interfaces, characterised in that it further includes means for measuring at least one external parameter linked to at least one of the user interfaces, the measuring means being connected to the management unit, and in that the control unit also includes comparison means for comparing a measured level with a predefined level of the external parameter, and control means arranged for activating or deactivating the processing means associated with the user interface linked to the measured external parameter as a function of the result of the comparison.

According to another advantageous embodiment of the invention, the portable electronic object further includes warning means activated for warning the user when said processing means of one of the user interfaces are deactivated.

The invention also concerns a method of determining a user interface of a portable electronic object according to the various embodiments described hereinbefore.

BRIEF DESCRIPTION OF THE DRAWINGS

The invention will be explained hereinafter in detail for embodiments given solely by way of example, these embodiments being illustrated by the annexed drawings, in which.

DETAILED DESCRIPTION OF THE INVENTION

Figure 1:
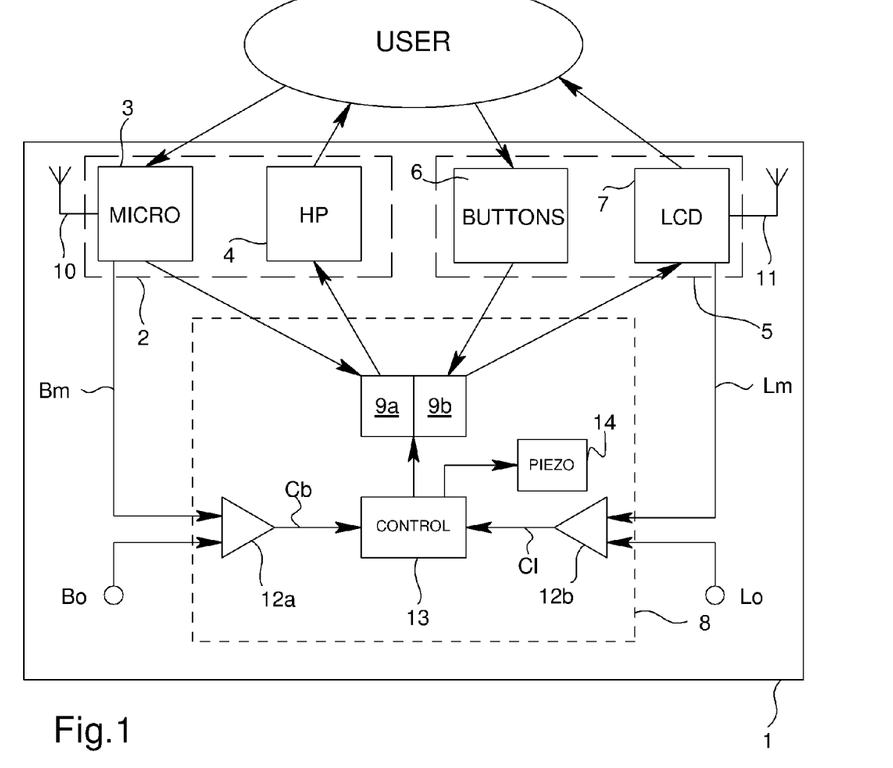
FIG. 1 shows a block diagram of the portable object according to a first embodiment of the invention.

The block diagram shown in FIG. 1 is applicable to any type of portable electronic object 1 and preferably to a wristwatch or a portable telephone. Portable object 1 includes in particular a first user interface 2 called a "vocal" interface comprising sound signal reception means 3, for example a microphone, and also able to include sound signal transmission means 4, for example a loudspeaker.

Preferably, portable object 1 further includes a second user interface 5 called the "tactile" interface, comprising control members 6, for example push-buttons or tactile keys and display means 7, for example a liquid crystal display or simply a set of hands moving opposite indications.

A management unit 8 controls the various user interfaces, and thus it includes processing means associated with each of the user interfaces. Means for processing the sound signals 9a associated with first user interface 2 manage the received sound signals and where appropriate the sound signals to be transmitted and control member processing means 9b associated with second user interface 5 manage the received commands and where appropriate the data to be displayed.

As already mentioned hereinbefore, it is one of the objects of the invention to be able to change the user interface as a function of external conditions, in particular according to this embodiment, of the ambient noise and ambient light. In order to do this, portable object 1 is provided with an ambient noise sensor 10, and advantageously, a light sensor 11. It will be noted that preferably, microphone 3 is used as the ambient noise sensor and liquid crystal display 7 as the light sensor.

The ambient noise sensor enables measurements of the ambient noise level to be taken, these measurements being transmitted to the management unit by means of the signal Bm. Light sensor 11 enables measurements of the level of light it is receiving to be taken, these measurements being transmitted to management unit 8 by means of a signal Lm. The management unit with which the ambient noise and light sensors are associated, includes first and second comparison means 12a and 12b, for respectively comparing the measured ambient noise level Bm with a predefined noise level Bo and the measured received light Lm with a predefined light level Lo. The first comparison means 12a receive at one input the measured ambient noise level signal Bm from ambient noise sensor 10 and at the other input, a signal corresponding to a predefined noise level Bo and the second comparison means 12b receive at one input the measured received light level signal Lm from light sensor 11 and, at the other input, a signal corresponding to a predefined light level Lo. As a function of the result of the comparison of the two signals received at input, the first comparison means 12a, respectively the second comparison means 12b, send at output a control signal respectively Cb, Cl to control means 13 arranged for deactivating the sound signal processing means 9a and/or the control member processing means 9b depending upon the result of the comparisons carried out by comparison means 12a and 12b. An example of controlling the activation and deactivation of the various processing means, as a function of external conditions, is given in the table of FIG. 2.

Advantageously, the management unit also includes warning means 14, for example an electromagnetic vibrator, connected to control means 13. These warning means 14 are in particular used for warning the user, by means of mechanical vibrations, that one of the predefined levels (Bo, Lo) has been exceeded and that one of the user interfaces can no longer be used or can be used again.

Figure 2:
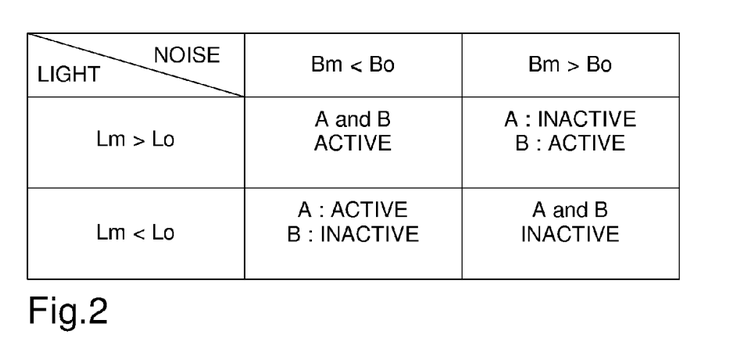
FIG. 2 shows an operating table of the portable processing means object as a function of external conditions.

The table of FIG. 2 shows the active or inactive state of the processing means for the received sound signals and possibly signals to be transmitted (A), and processing means for the commands received by means of the control members and possibly the data to be displayed (B), as a function of the ambient noise and received light conditions.

As regards the ambient noise, a predefined noise level Bo will be assumed to correspond advantageously to the noise level beyond which the sound signal processing means (A) no longer operate properly. As regards the light received by the light sensor, a predefined light level Lo will be assumed to correspond, for example, to a sufficient level of luminosity to see clearly the data displayed by the display means of the portable object.

Thus:

for a measured ambient noise level Bm less than or equal to the predefined noise level Bo and for a measured received light level Lm greater than or equal to predefined light level Lo, processing means A and/or B are activated;

for a measured ambient noise level Bm less than or equal to predefined noise level Bo and for a measured received light level Lm less than predefined light level Lo, processing means A are activated and processing means B are deactivated;

for a measured ambient noise level Bm greater than predefined noise level Bo and for a measured received light level Lm greater than or equal to predefined light level Lo, processing means A are deactivated and processing means B are activated;

for a measured ambient noise level Bm greater than predefined noise level Bo and for a measured received light level Lm less than predefined light level Lo, processing means A and B are deactivated.

According to a variant of this first embodiment of the invention, warning means 14 are activated only when one of the predefined noise or light levels is exceeded, leaving the user to choose whether to interrupt the use of the function in progress.

It will be noted that the sound signal processing means (A) can conventionally include a voice recognition system for managing the received signals and a word synthesiser for managing the sound signals to be transmitted.

Figure 3:
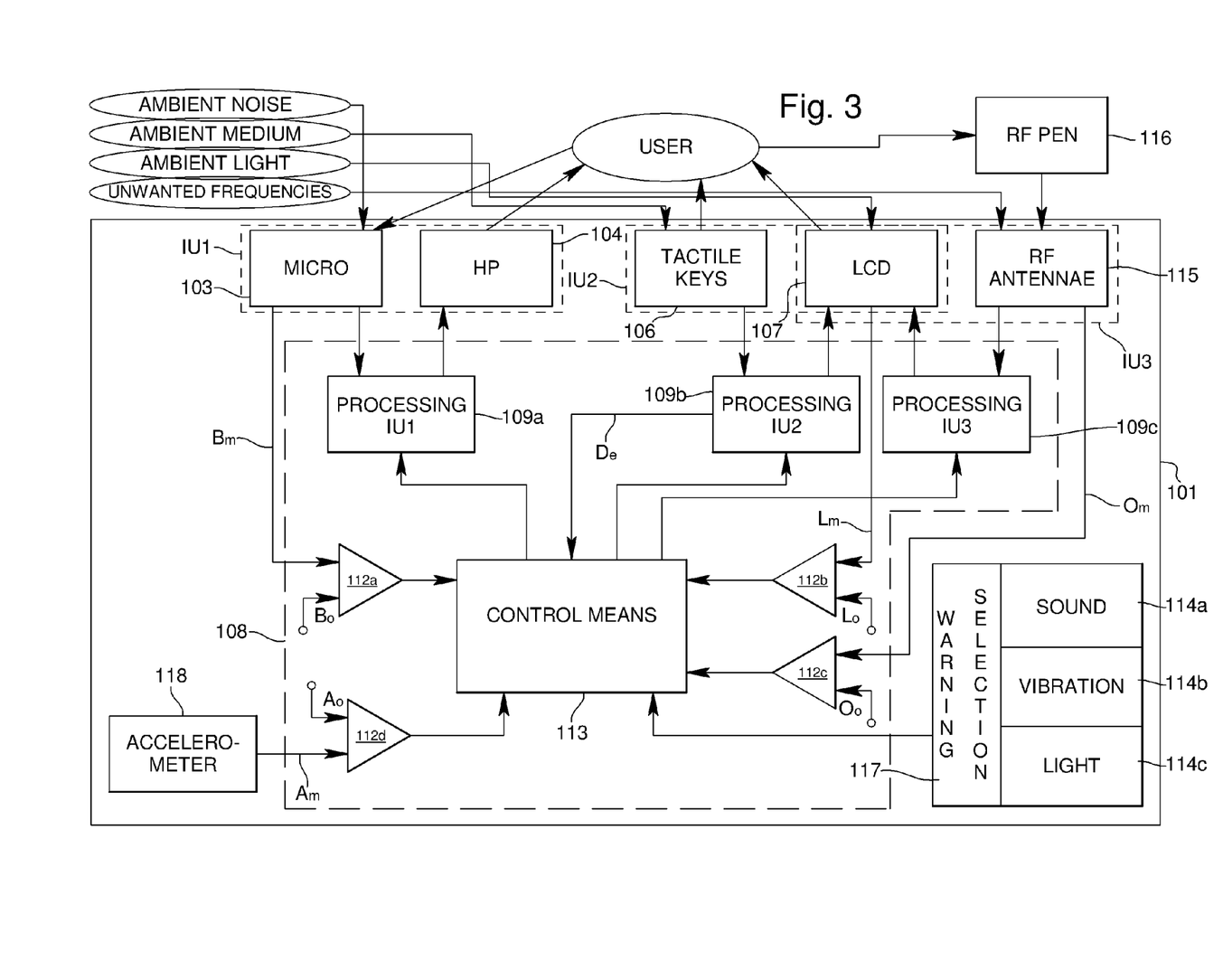
FIG. 3 shows a block diagram of a portable object according to a second embodiment of the invention.

FIG. 3 shows a block diagram of a portable object, preferably a diary-watch, according to a second embodiment of the invention.

Portable object 101 includes a first user interface IU1 called the "vocal" interface, similar to that described in the first embodiment. This first user interface comprises sound signal reception means 103, for example a microphone and is capable of also including sound signal transmission means 104, for example a loudspeaker.

Portable object 101 further includes a second user interface IU2 called the "tactile" interface, including tactile data introduction means, like for example a tactile crystal 106, including at least two electrodes or tactile keys, the operation of which is described in more detail in EP Patent Application Nos. 0 791 868 and 0 838 737, filed in the name of the Applicant and incorporated herein by reference are corresponding U.S. Pat. Nos. 5,812,498 (issued to Teres) and 6,184,871 (issued to Teres et al.), and data display means 107, for example a liquid crystal display or LCD. It should be noted that in the preferred case of a wristwatch, the tactile crystal is superposed on the LCD screen.

The portable object further includes a third user interface IU3, called the "radio-frequency or RF" interface, including radio-frequency reception means 115, for example an RF antenna, for receiving the radio-frequency signals transmitted by an RF pen type transmitter 116 with movement recognition and data display means 107. Preferably, the display means for the second and third user interfaces IU2 and IU3 are the same. It should be noted that the RF antenna could be used as an RF transmitter. The RF transmissions between the pen and the portable object can answer the requirements of the Bluetooth standard.

These three user interfaces are controlled by a management unit 108 including first 109a, second 109b and third 109c processing means respectively associated with first IU1, second IU2 and third IU3 user interfaces. The first processing means 109a process the sound signals received via microphone 103 and possibly the sound signals to be transmitted by means of loudspeaker 104. The second processing means 109b process the data introduced by means of the keys of tactile screen 106 and possibly display data on LCD screen

107. The third processing means 109*c* process the RF signals received from the RF pen 116 handled by the user and possibly display data on LCD screen 107.

Portable object 101 also includes various means for measuring external parameters linked to the user interfaces, these measuring means being connected to the management unit. There is provided, in particular, an ambient noise sensor, advantageously microphone 103, for measuring an ambient noise level (Bm), a light sensor advantageously using LCD screen 107 to collect light in association with a diode that is not shown, for detecting a received light level (Lm), an unwanted frequency sensor, advantageously RF antenna 115, for measuring the level of unwanted frequencies (Om), and means detecting activation of each of the electrodes of tactile crystal 106, advantageously incorporated in second processing means 109*b*, which send a signal (De) to control means 113, if all of tactile keys 106 are simultaneously activated.

Management unit 108 comprises first comparison means 112*a* for comparing said ambient noise level (Bm) with a predefined noise level (Bo), second comparison means 112*b* for comparing said received light level (Lm) with a predefined light level (Lo), third comparison means 112*c* for comparing the measured unwanted frequency level (Om) with a predefined unwanted frequency level (Oo), and control means 113 arranging for respectively deactivating:

sound signal processing means 109*a* when the ambient noise level exceeds the predefined noise level, Bm>Bo, control member processing means 109*b* when the received light level passes below the predefined light level, Lm<Lo or when simultaneous activation of said at least two electrodes is detected, and radio-frequency signal processing means 109*c* when the received light level passes below the predefined light level Lm<o, or when the unwanted frequency level exceeds the predefined unwanted frequency level, Om>Oo.

An example decision tree for choosing a user interface will be explained in detail in FIG. 4.

Portable object 101 is also provided with warning means activated to warn the user when the processing means associated with one or several of the user interfaces are deactivated. Advantageously, several warning means are provided in order to ensure that the user is properly warned. Means 117 for choosing between these various warning means are then added, the selection then being established as a function of at least one predetermined criterion. There are, for example, first warning means of the acoustic alarm type 114*a* preferably activated when the received light is less than the predefined light level, second warning means of the vibrating alarm type 114*b* preferably activated when it is detected that the portable object is immersed in a liquid medium, and third warning means of the flashing or light alarm type 114*c* preferably activated when the ambient noise level exceeds the predefined noise level. Other selection criteria for the various warning means could evidently be used.

It should be noted that, advantageously, the portable object further comprises success rate calculation means, not shown in FIG. 3, for checking that the processing means associated with the interface used are operating properly.

Advantageously, the portable object can also comprise presetting means, not shown, allowing the user to deactivate one or more user interfaces. These pre-settings offer the user the opportunity of deactivating, for example, the first "vocal" user interface when he goes to the theatre or cinema.

It has already been mentioned that, as a function of an external parameter, like the ambient noise, the received light, unwanted frequencies or even the medium in which the portable object is immersed, the processing means of some of the user interfaces are deactivated, the processing means no longer being able to be used properly. It is also possible for one or several of the user interfaces to be longer able to be used properly because of an inadvertent action by the user for example as a function of his activity. Indeed, a user practicing a sport such as running or cycling will have difficulty in properly using the second IU2 and third IU3 user interfaces. In order to solve this, the portable object is provided with movement sensors, like for example an accelerometer 118, in order to determine whether the user's activity allows proper and reliable use of the various user interfaces. In the case of an accelerometer, an acceleration level (Am) of the object is measured and compared, via fourth comparison means 112*d*, to a predefined acceleration level (Ao) of this object. When the measured acceleration level exceeds the predefined acceleration level, Am>Ao, the processing means of one or even all of the user interfaces could be deactivated.

According to a variant of this second embodiment, the user is only warned that the processing means associated with one or several user interfaces are no longer operating properly. Means for measuring at least one external parameter linked to at least one of said user interfaces allows an external parameter level to be measured, comparison means compare this measured level with a predefined measurement of the parameter and as a function of the comparison result the warning means are activated.

Figure 4:
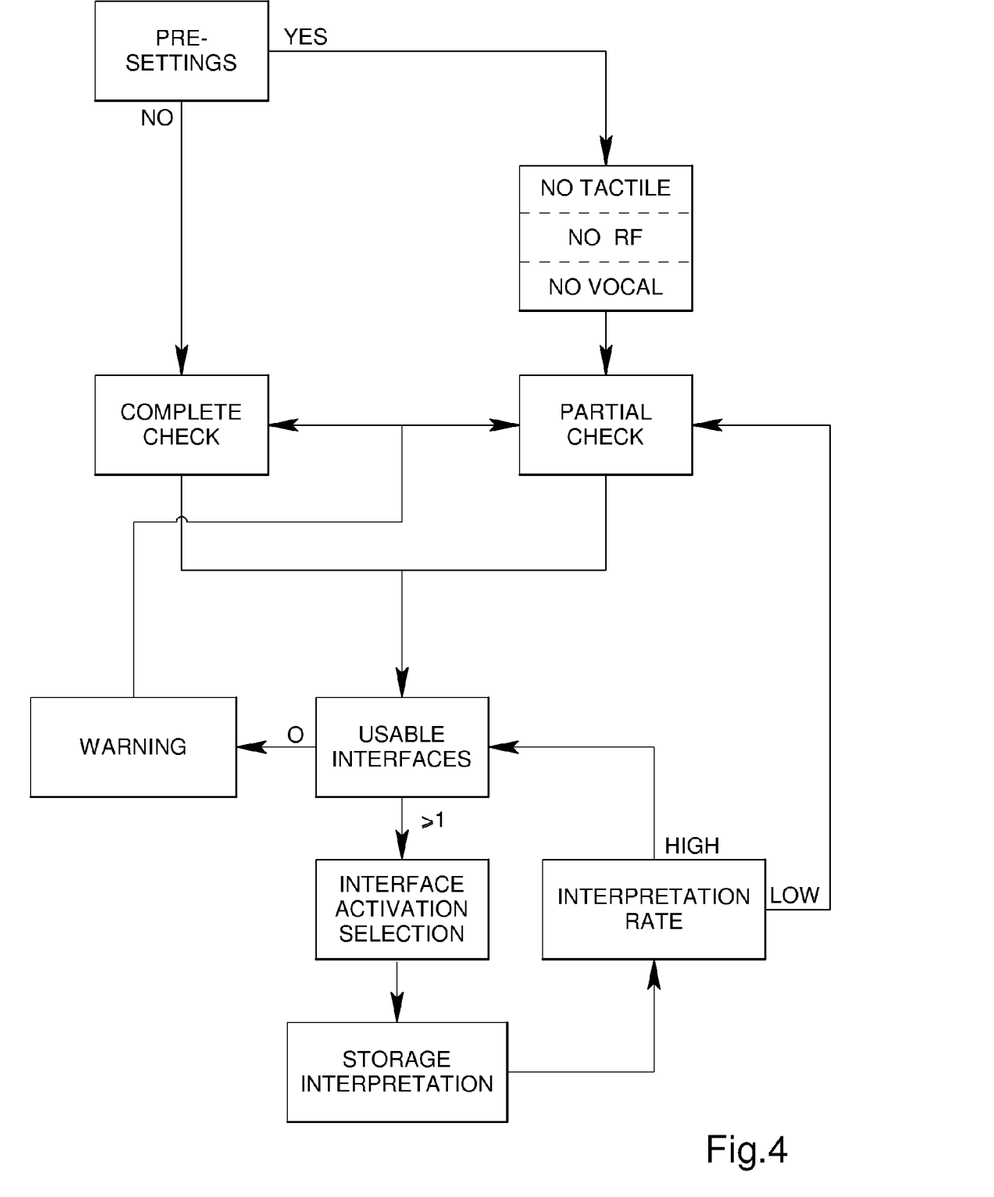
FIG. 4 shows a decision tree according to a preferred variant of the second embodiment of the portable object.

FIG. 4 shows a decision tree, according to a preferred variant of the second embodiment of the portable object, for determining a user interface of a portable electronic object comprising several user interfaces.

According to this variant, the user can carry out pre-settings before any use of the portable object. The purpose of these pre-settings is to allow the user to deactivate one or several initially available user interfaces. In fact, it may be useful to be able to deactivate some interfaces manually depending upon one's location, the activity one is carrying out, etc...

Assuming that the user does not want to carry out pre-settings, alternative NO, the portable object then performs a complete check consisting in carrying out all the tests provided, based on external parameters, each linked to at least one of the interfaces in order to determine which can be used in predefined acceptable conditions. Advantageously, there is at least one test for each of the three, vocal, tactile or RF user interfaces.

Assuming that the user wants to carry out pre-settings, alternative YES, it is possible for him to deactivate 1, 2 or 3 processing means associated with the three initially available user interfaces. Once the pre-settings have been carried out, the portable object makes a partial check consisting in carrying out only those tests based on the external parameters linked to the user interfaces whose processing means have not been deactivated.

Figure 5A:
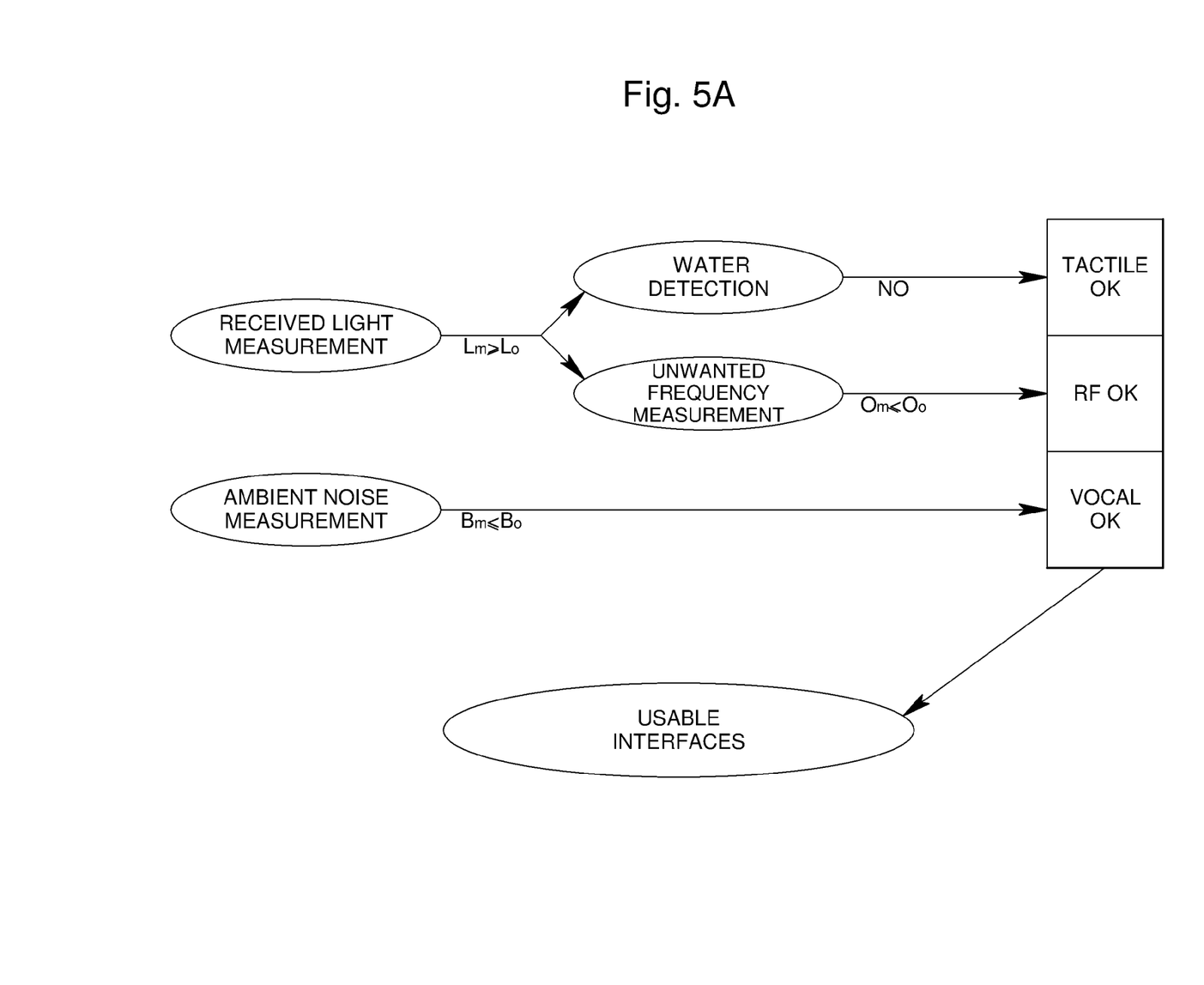
FIG. 5A shows a possible sequencing example of the tests carried out within a complete check of FIG. 4.
Figure 5B:
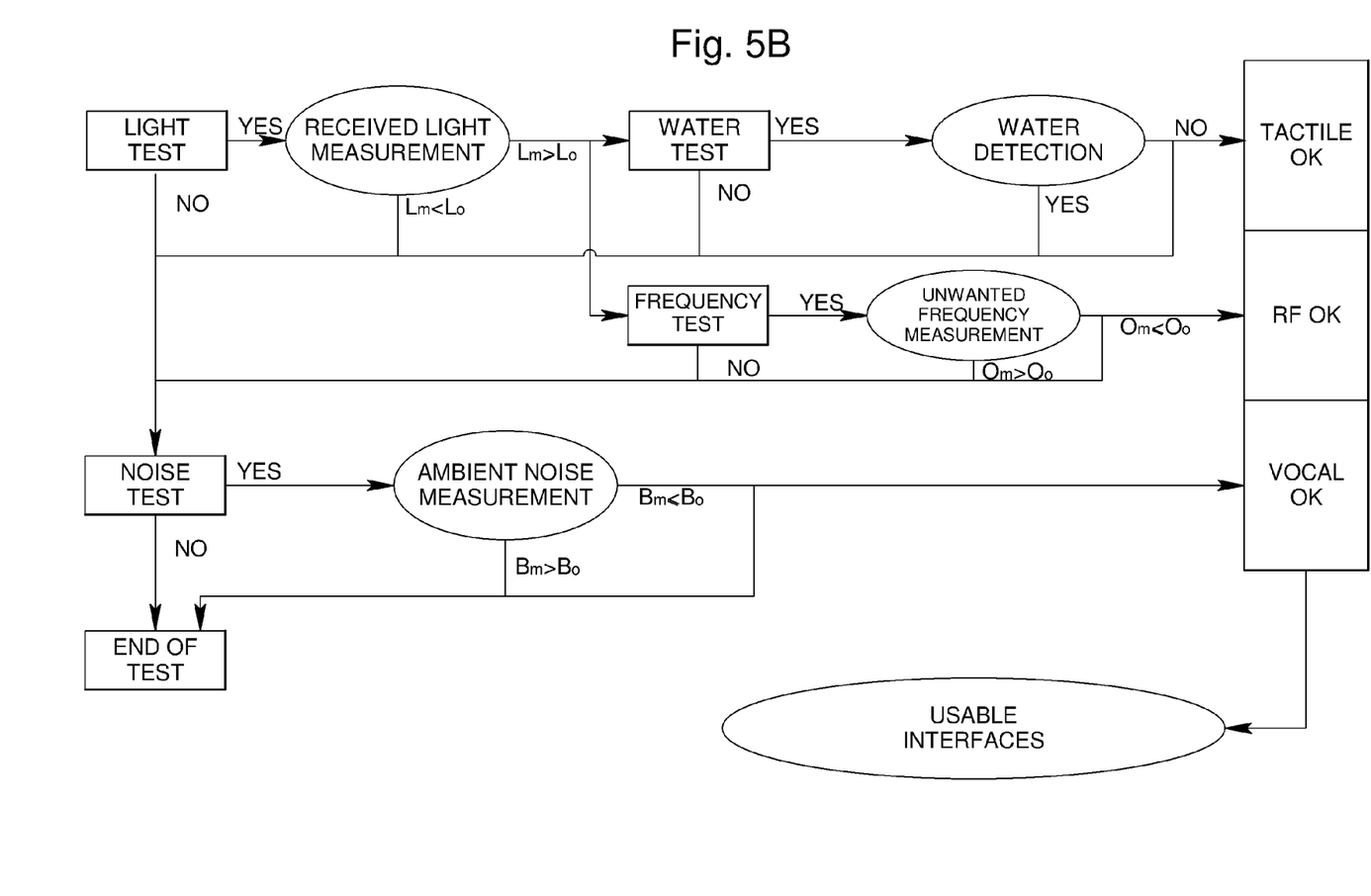
FIG. 5B shows a possible sequencing example of the tests carried out within a partial check of FIG. 4.

The detail of the tests that can be carried out within the scope of the complete and partial checks is described respectively in FIGS. 5A and 5B.

Once the complete or partial check has been carried out, if no user interface can be used in the predefined acceptable conditions, the user is warned by warning means of the type described in FIG. 3, a new checking cycle is then undertaken either after a determined delay, or upon the user's request. If only one user interface can be used, it is automatically selected and made active. If at least two user interfaces can be used, the portable object selects one of these interfaces as a function of a predetermined criterion. This selection criterion can be for example, the level of energy consumption of each of the usable user interfaces, the lowest energy-consuming interface being then selected. Another selection criterion can be the estimated mean data introduction speed, the speediest interface then being selected, namely for the interfaces described in FIG. 3, the first, third and second interfaces. Any other predefined selection criterion, in particular defined by the user himself, can also be envisaged.

When a user interface has been selected, the processing means associated with that interface are then activated, these means interpreting and storing data introduced by the user. Advantageously, a check is regularly carried out on the interpretation success rate of the processing means. A predefined level allows this success rate to be divided into two categories, HIGH and LOW. If the success rate is HIGH, interpretation by the processing means of the data that the user wishes to introduce is satisfactory and interpretation can continue. If, however, the success rate is LOW, interpretation by the processing means is mediocre and the portable object automatically deactivates these processing means and carries out a partial check on the remaining interfaces, taking account of pre-settings. During these operations, the warning means can be activated in order to warn the user of the situation.

FIG. 5A shows a possible sequencing example of the tests carried out in a complete check of FIG. 4.

First of all, it is possible to carry out in parallel an ambient noise measurement, "AMBIENT NOISE MEASUREMENT" and a received light measurement, "RECEIVED LIGHT MEASUREMENT".

The measured ambient noise level (Bm) is compared to a predefined noise level (Bo). When the measured ambient noise does not exceed the predefined ambient noise, $Bm \leq Bo$, a signal is sent to the management unit to indicate that the first vocal interface can be used "VOCAL OK".

The measured received light level (Lm) is compared to a predefined light level (Bo). When the measured received light level exceeds or equals the predefined light level, $Lm \geq Lo$, the second and third tactile and RF interfaces are capable of being used, this is why two other tests are preferably carried out in parallel. An ambient medium detection test, "WATER DETECTION", to check whether the portable object has been immersed in a liquid medium, for example water, preventing the use of the tactile crystal and another test for checking the level of unwanted frequencies, "UNWANTED FREQUENCY MEASUREMENT", present in the environment of the portable object.

The ambient medium detection test, "WATER DETECTION", allows activation of each of the electrodes of the tactile crystal to be detected. If no simultaneous activation of all of the electrodes is detected, a signal (NO) is sent to the control unit to indicate that the second tactile user interface can be used, "TACTILE OK".

At the same time, the unwanted frequency level (Om) is compared to a predefined frequency level (Oo). When the measured unwanted frequency level does not exceed the predefined unwanted frequency level, $Om \leq Oo$, a signal is sent to the management unit to indicate that the third RF user interface can be used, "RF OK".

Once all the tests have been carried out, the management unit knows which user interfaces can be used.

FIG. 5B shows a possible sequencing example of the tests carried out in a partial check of FIG. 4.

The partial check differs from the complete check in that the user has defined pre-settings and/or in that the processing means of one of the user interfaces have already been deactivated because of their interpretation rate is too low. Consequently, the measurement or detection tests relating to the user interfaces whose processing means are deactivated are not carried out.

There is thus the following pre-processing:
If the processing means of the first vocal user interface are deactivated, the test consisting in carrying out an ambient noise measurement is not carried out;
If the processing means of the second tactile user interface are deactivated, the test consisting in detecting the activation of the tactile crystal electrodes is not carried out;
If the processing means of the third RF user interface are deactivated, the test consisting in measuring the unwanted frequency level is not carried out;
If the processing means of the second and third, tactile and RF user interfaces are deactivated, the test consisting in measuring the received light is not carried out;
If the processing means of the three user interfaces are deactivated, no tests are carried out.

Depending upon the results of this pre-processing, the management unit may or may not carry out each of the available tests.

In the example shown, one preferably starts with the test for checking the received light level, "LIGHT TEST".

If it does not have to be carried out (NO), it is not necessary to carry out either the ambient medium test, "WATER TEST", or the test for checking the unwanted frequency level, "FREQUENCY TEST". The management unit then directly checks whether the test for checking the ambient noise level, "NOISE TEST", has to be carried out.

If it has to be carried out (YES), a received light level measurement is carried out, "RECEIVED LIGHT MEASUREMENT". The measured received light level (Lm) is compared to a predefined light level (Lo). When the received light level passes below the predefined light level, $Lm<Lo$, it is not necessary to carry out either the "WATER TEST" or the "FREQUENCY TEST". The management unit then checks directly whether the "NOISE TEST" has to be carried out. When the measured received light level exceeds or equals the predefined light level, $Lm \geq Lo$, the management unit checks, as a function of the pre-processing results, whether the "WATER TEST" and/or the "FREQUENCY TEST" have to be carried out.

If the "WATER TEST" has to be carried out (YES) and simultaneous activation of all the electrodes is not detected during the detection test, "WATER DETECTION", a signal (NO) is sent to the management unit to indicate that the second tactile user interface can be used, "TACTILE OK".

If the "FREQUENCY TEST" has to be carried out (YES), an unwanted frequency level measurement is carried out, "UNWANTED FREQUENCY MEASUREMENT". The measured unwanted frequency level (Om) is compared to a predefined frequency level (Oo). When the measured unwanted frequency level does not exceed the predefined frequency level, $Om \leq Oo$, a signal is sent to the management unit to indicate that the third RF user interface can be used, "RF OK".

Once this information has been received, if the "NOISE TEST" has to be carried out (YES), an ambient noise level measurement is carried out, "AMBIENT NOISE MEASUREMENT". The measured ambient noise level (Bm) is compared to a predefined noise level (Bo). When the measured ambient noise level des not exceed the predefined noise level, $Bm \leq Bo$, a signal is sent to the management unit to indicate that the first vocal user interface can be used, "VOCAL OK".

Once all the tests have been carried out, the management unit knows which of the user interfaces can be used.

As regards the check examples shown in FIGS. 5A and 5B, it is entirely possible to envisage altering the order of the tests carried out, or even to carry them all out in parallel.

As previously mentioned, the invention also concerns a method of determining one user interface among the available usable interfaces as a function of conditions external to the portable object.

In the case of a portable object including a first user interface comprising sound signal reception means, and a management unit comprising first sound signal processing means, the method includes at least the following operations:
- carrying out a measurement of the ambient noise (Bin) by means of an ambient noise sensor connected to said management unit;
- comparing the measured ambient noise level to a predefined noise level (Bo),
- deactivating said first processing means when the measured ambient noise level exceeds the predefined ambient noise level (Bin >Bo).

If the portable object further includes a second user interface comprising a tactile crystal including at least two electrodes and display means, a third user interface including radio-frequency signal reception means and display means, the management unit also including second processing means for the tactile crystal and third radio-frequency signal processing means, the method then also includes the following operations:
- carrying out a measurement of the received light level (Lm) by means of a light sensor connected to said management unit;
- comparing the measured received light level to a predefined light level (Lo);
- deactivating said second and third processing means when the measured received light level passes below the predefined light level (Lm<Lo).

Advantageously, when the measured received light level exceeds or is equal to the predefined light level (Lm≧Lo), the method also includes the following operations:
- detecting the activation of each of said at least two electrodes by means of a detector connected to said management unit;
- deactivating said second processing means when simultaneous activation of said at least two electrodes is detected;
- carrying out a measurement of the unwanted frequencies (Om) by means of an unwanted frequency sensor connected to the management unit;
- comparing the measured unwanted frequency level to a predefined unwanted frequency level (Oo);
- deactivating said third processing means when the measured unwanted frequency level exceeds the predefined unwanted frequency level (OM>Oo).

Preferably, the user can define pre-settings to indicate the processing means that should be automatically deactivated, and in such case the measuring or detection operations relating to the user interfaces whose processing means are deactivated, are not carried out.

The final object is to select a user interface that can be used, and for this one interface is preferably selected from among the interfaces whose processing means are not deactivated, in accordance with a predetermined criterion, such as energy consumption or processing speed. When one interface has been selected, the interpretation rate of the processing means associated with the selected user interface is periodically calculated, then compared to a predefined minimum interpretation rate, and finally the processing means of the selected user interface are deactivated if the calculated interpretation rate is less than the minimum predefined interpretation rate.

The measuring or detection operations relating to the user interfaces whose processing means are not deactivated, are then carried out again.

Moreover, the measuring or detection operations relating to the user interfaces whose processing means are not automatically deactivated, are preferably carried out regularly.

If none of the user interfaces can be used, the user is warned that none of the user interfaces can be used by the warning means.

It should be noted that the description is given only by way of example and that other embodiments, in particular user interfaces and sensors incorporated in the portable object, can form the subject of the present invention.

In particular, it should be noted that the sound signal processing means of the vocal interface could be simply storage means for words received and to be transmitted. The portable object would then further include means for radio-frequency or infrared communication with a computer in order to transmit and receive the stored words, voice recognition and synthesizing being carried out on the computer.

It should also be noted that for the sake of energy saving, the functions of the portable object, like for example an electronic diary, are not activated during usual use of the object as a watch or telephone. These particular functions can be activated in various ways, particularly by specific activation of one of the user interfaces. For the vocal interface, a particular sound may be recognized. For the tactile interface, activation of a particular tactile key may be detected. Finally, for the RF interface, a particular RF signal transmitted by the RF pen may be detected.

When the functions of the portable object are being used, the user can choose manually the interface that he wishes to use or he can let the object determine the interface as a function of external parameters.

In this latter case, when the portable object is in a critical environment for all of the interfaces, it can determine an interface to use by means of a fuzzy logic method, i.e. not on the basis of predefined threshold values, but on the basis of ranges of weighted values. This method has the advantage of allowing the object to be able to choose the least critical interface when none of the interfaces are a priori able to be used.

It will be noted finally, that the light sensor used can be a light source able to measure the intensity of the ambient light as described in EP Patent Application No. 02075879.3 filed in the name of the Applicant.

The invention claimed is:

1. A portable electronic object including
(a) a first user interface;
(b) at least one second user interface;
(c) a management unit for said user interfaces including first and at least second processing means respectively associated with said first and at least second user interfaces;
(d) means for measuring at least one external parameter linked to at least one of said user interfaces, said measuring means being connected to said management unit;
(e) comparison means for comparing a level of said measured external parameter to a predefined level of said external parameter; and
(f) control means arranged for activating or deactivating said processing means associated with said user interface linked to the measured external parameter as a function of a result of the comparison,
wherein the portable electronic object further comprises:
(g) means for selecting a user interface from among said user interfaces having associated processing means that are not deactivated, in accordance with a determined criterion, wherein said first user interface includes sound signal reception means, said first associated processing means being sound signal processing means, said second user interface includes control members and display means, said second associated processing means being control member processing means, said measuring means include an ambient noise sensor for measuring an ambient noise level, said management unit also including first comparison means for comparing said ambient noise level to a predefined noise level, said control means being arranged for deactivating the sound signal processing means when the ambient noise level exceeds the predefined noise level, wherein the measuring means further comprise a light sensor for measuring a received light level, said management unit also including second comparison means for comparing said received light level to a predefined light level, said control means also being arranged for deactivating said control member processing means when the received light level passes below the predefined light level, wherein said control members are a tactile crystal including at least two electrodes, wherein said portable object also includes (h) means for detecting activation of each of said at least two electrodes, said detection means being connected to said management unit;

and wherein said control means are also arranged for deactivating said control member processing means when simultaneous activation of said at least two electrodes is detected.

2. The portable electronic object according to claim 1, further including (i) a third user interface including radio-frequency signal reception means and said display means, said management unit also including radio-frequency signal processing means and wherein said control means are also arranged for deactivating said radio-frequency signal processing means when the received light level passes below the predefined light level.

3. The portable electronic object according to claim 2, further including (j) warning means activated to warn the user in the event of deactivation of said sound signal, control member or radio-frequency signal processing means.

4. The portable electronic object according to claim 3, wherein said warning means include first warning means of the acoustic alarm type;

second warning means of the vibrating alarm type; and third warning means of the flashing alarm type; and wherein said management unit further includes means for selecting between said first, second and third warning means as a function of at least one predetermined criterion.

5. The portable electronic object according to claim 2, wherein said display means in association with a diode are used as the light sensor, wherein said sound signal reception means are also used as the ambient noise sensor and wherein the radio-frequency signal reception means are also used as an unwanted frequency sensor.

6. The portable electronic object according to claim 1, wherein the portable object is a diary watch.

7. The portable electronic object according to claim 1, wherein the management unit also includes means for determining an interface based on a fuzzy logic method when no interface is a priori used.

8. A portable electronic ,including (a) a first user interface;

(b) at least one second user interface;

(c) a management unit for said user interfaces including first and at least second processing means respectively associated with said first and at least second user interfaces;

(d) means for measuring at least one external parameter linked to at least one of said user interfaces, said measuring means being connected to said management unit;

(e) comparison means for comparing a level of said measured external parameter to a predefined level of said external parameter; and (f) control means arranged for activating or deactivating said processing means associated with said user interface linked to the measured external parameter as a function of a result of the comparison, wherein the portable electronic object further comprises:

(g) means for selecting a user interface from among said user interfaces having associated processing means that are not deactivated, in accordance with a determined criterion, wherein said first user interface includes sound signal reception means, said first associated processing means being sound signal processing means, said second user interface includes control members and display means, said second associated processing means being control member processing means, said measuring means include an ambient noise sensor for measuring an ambient noise level, said management unit also including first comparison means for comparing said ambient noise level to a predefined noise level, said control means being arranged for deactivating the sound signal processing means when the ambient noise level exceeds the predefined noise level, wherein the measuring means further comprise a light sensor for measuring a received light level, said management unit also including second comparison means for comparing said received light level to a predefined light level, said control means also being arranged for deactivating said control member processing means when the received light level passes below the predefined light level;

wherein said portable object also includes (h) an unwanted frequency sensor for measuring an unwanted frequency level, said control unit including third comparison means for comparing said measured unwanted frequency level to a predefined frequency level, said control means also being arranged for deactivating the radio-frequency signal processing means when the unwanted frequency level exceeds the predefined frequency level.

9. The portable electronic object according to claim 8, further including (i) means for measuring an acceleration level of said portable object; and (j) fourth comparison means for comparing the measured acceleration level to a predefined acceleration level, said management unit control means being capable of deactivating the various user interface processing means when the measured level exceeds the predefined level.

10. A portable electronic object including (a) a first user interface;

(b) at least one second user interface;

(c) a management unit for said user interfaces including first and at least second processing means respectively associated with said first and at least second user interfaces;

(d) means for measuring at least one external parameter linked to at least one of said user interfaces, said measuring means being connected to said management unit;

(e) comparison means for comparing a level of said measured external parameter to a predefined level of said external parameter; and (f) control means arranged for activating or deactivating said processing means associated with said user interface linked to the measured external parameter as a function of a result of the comparison, wherein the portable electronic object further comprises:

(g) means for selecting a user interface from among said user interfaces having associated processing means that are not deactivated, in accordance with a determined criterion wherein the predetermined criterion is selected in accordance with the following criterions:

the energy consumption level of each of the user interfaces that can be used, that having the lowest consumption being selected;

the estimated data introduction mean speed, that offering the highest speed being selected.

11. A method of determining a user interface of a portable electronic object including a first user interface, at least a second user interface, a management unit for said user interfaces including first and at least second processing means respectively associated to said first and at least second user interfaces, the method including the following operations:

(a) carrying out a measurement of at least one external parameter linked to at least one of said user interfaces by means of a sensor for sensing the level of the external parameter, the sensor being connected to the management unit;

(b) comparing the measured external parameter level to a predefined external parameter level;

(c) deactivating said processing means associated to the user interface linked to the measured external parameter in accordance to the result of the comparison; wherein the method includes the following additional operation:

(d) selecting a user interface among the user interfaces having associated processing means that are not activated in accordance with a predetermined criterion; wherein the portable electronic object includes said first user interface;

said at least one second user interface;

said management unit for said user interfaces including first and at least second processing means respectively associated with said first and at least second user interfaces;

means for measuring at least one external parameter linked to at least one of said user interfaces, said measuring means being connected to said management unit;

comparison means for comparing a level of said measured external parameter to a predefined level of said external parameter; and control means arranged for activating or deactivating said processing means associated with said user interface linked to the measured external parameter as a function of the result of the comparison;

means for selecting a user interface from among said user interfaces having associated processing means that are not deactivated, in accordance with a determined criterion, wherein said first user interface includes sound signal reception means, said first associated processing means being sound signal processing means:

said second user interface includes control members and display means, said second associated processing means being control member processing means: and said measuring means include an ambient noise sensor for measuring an ambient noise level, said management unit also including first comparison means for comparing said ambient noise level to a predefined noise level, said control means being arranged for deactivating the sound signal processing means when the ambient noise level exceeds the predefined noise level, wherein the measuring means further comprise a light sensor for measuring a received light level, said management unit also including second comparison means for comparing said received light level to a predefined light level, said control means also being arranged for deactivating said control member processing means when the received light level passes below the predefined light level; wherein for the first user interface the following operations are carried out:

(e) carrying out a measurement of the ambient noise level by means of an ambient noise sensor connected to the management unit;

(f) comparing the measured ambient noise level to a predefined noise level; and (g) deactivating said first processing means when the measured ambient noise level exceeds the predefined noise level;

and wherein the following operations are carried out for the second user interface:

(h) carrying out a measurement of the received light level by means of a light sensor connected to said management unit;

(i) comparing the measured received light level to a predefined light level; and (j) deactivating said second processing means when the measured received light level passes below the predefined light level, wherein said second user interface includes a tactile crystal including at least two electrodes and display means and wherein a third user interface is provided, said third user interface including radio-frequency signal reception means and said display means, said management unit also comprising second tactile crystal processing means and third radiofrequency signal processing means, wherein the method also includes the following operations when the measured received light level exceeds the predefined light level:

(k) detecting the activation of each of said at least two electrodes by means of a detector connected to said management unit;

(l) deactivating said second processing means when simultaneous activation of said at least two electrodes is detected;

(m) carrying out a measurement of the unwanted frequencies by means of an unwanted frequency sensor connected to the management unit;

(n) comparing the measured unwanted frequency level to a predefined unwanted frequency level; and (o) deactivating said third processing means when the measured unwanted frequency level exceeds the predefined unwanted frequency level.

12. The method of determining a user interface of a portable object according to claim 11, wherein the method includes a preliminary operation consisting for the user in:

(p) defining pre-settings for indicating the processing means to be automatically deactivated;

and wherein the measuring or detection operations relating to the user interfaces having processing means that are deactivated, are not carried.

13. The method of determining a user interface of a portable object according to claim 11, wherein the method includes the following subsequent operations of:

(q) calculating an interpretation rate of said processing means associated with the selected user interface;

(r) comparing the calculated interpretation rate with a predefined minimum interpretation rate; and (s) deactivating the processing means of the selected user interface if the calculated interpretation rate is less than the minimum interpretation rate, and wherein the measuring or detection operations relating to the user interfaces having processing means that are not deactivated, are carried out again.

14. The method of determining a user interface of a portable object according to claim 13, further including, if no user interface can be used, an operation consisting in:

(t) warning the user that none of the user interfaces are usable via warning means.

15. The method of determining a user interface of a portable object according to claim 13, wherein periodically the measuring or detection operations relating to the user interfaces having processing means that are not automatically deactivated, are carried out again.

16. The method of determining a user interface of a portable object according to claim 11, wherein if none of the interfaces a priori used, the management unit determines an interface on the basis of a fuzzy logic method.

* * * * *